Sept. 2, 1952 J. C. CHAMBERLAIN 2,609,042
AUTOMOBILE CANOPY
Filed Aug. 31, 1951
FIG. 1.
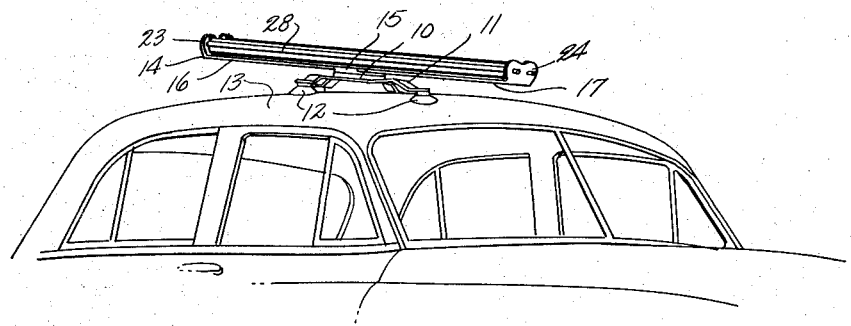
FIG. 2.
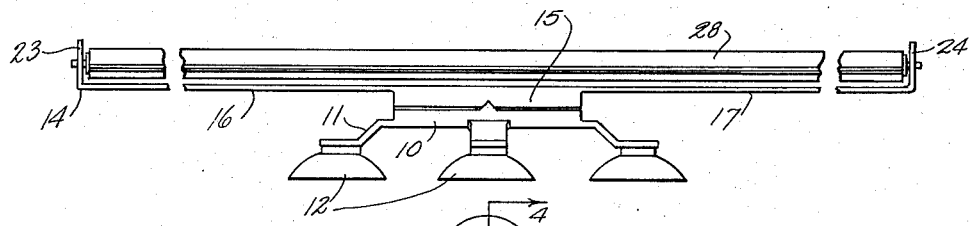
FIG. 3.
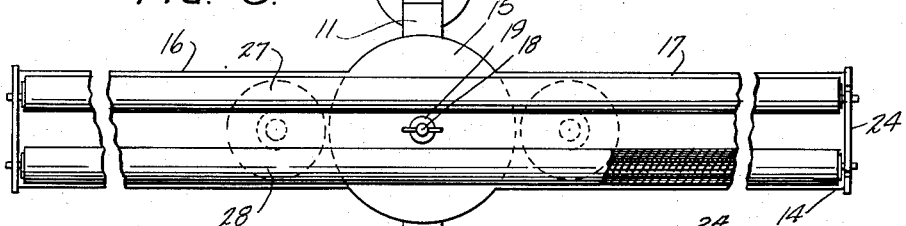
FIG. 4.
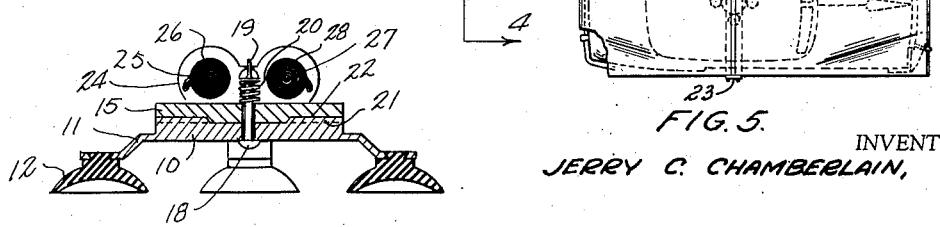
FIG. 5.
INVENTOR
JERRY C. CHAMBERLAIN,
BY
McMorrow, Berman & Davidson
ATTORNEYS Patented Sept. 2, 1952

2,609,042

UNITED STATES PATENT OFFICE 2,609,042

AUTOMOBILE CANOPY

Jerry C. Chamberlain, Phoenix, Ariz.

Application August 31, 1951, Serial No. 244,519

3 Claims. (Cl. 160—122)

This invention relates to a detachable automobile canopy and more particularly to a roll up canopy which can be mounted on an automobile roof to provide a covering for the automobile or a shade or awning adjacent the automobile.

It is among the objects of the invention to provide an improved roll up canopy which can be detachably mounted on an automobile roof with no modification of the roof construction and can be pivotally moved to different angular positions relative to the longitudinal center line of the associated automobile; which includes two portions, one for covering the front and one for covering the rear portion of the automobile, the division of the canopy into two portions reducing the extent and weight of material handled at one time and greatly facilitating the use of the device; which may be used as a cover for the associated automobile and also to provide an awning or shelter adjacent the automobile and afford protection from rain or sun, as when a person is changing an automobile tire; which does not materially increase the wind resistance to movement of the automobile; and which is simple and durable in construction, economical to manufacture, easy to install and use, and neat and attractive in appearance.

Other objects and advantages will become apparent from a consideration of the following description and the appended claims in conjunction with the accompanying drawing wherein:

Figure 1 is a perspective view of the upper portion of an automobile showing a canopy illustrative of the invention operatively mounted on the automobile roof;

Figure 2 is a side elevational view of the canopy;

Figure 3 is a top plan view of the canopy;

Figure 4 is a transverse cross sectional view on the line 4—4 of Figure 3; and

Figure 5 is a top plan view on a reduced scale of an automobile with the canopy in covering relationship thereto.

With continued reference to the drawing, the detachable canopy comprises a base plate 10 of circular shape having flat, substantially parallel faces and legs 11 projecting radially therefrom at substantially equal angular intervals therearound, four legs spaced apart at angular intervals of approximately 90 degrees being shown in the accompanying drawing.

Suction cups 12 of suitable resilient material, such as vulcanized rubber, are mounted one on each leg at the outer ends of the legs and are adapted to suctionally adhere to the upper surface of the roof 13 of an associated automobile to secure the base plate 10 on the roof.

A bracket 14 including a center portion 15 in the form of a circular plate of substantially the same diameter as the base plate 10 and arms 16 and 17 projecting radially from the center portion 15 at substantially diametrically opposed sides of the latter and in longitudinal alignment with each other, is mounted on the base plate.

The base plate 10 and the bracket center portion 15 are provided with centrally located, mutually registering apertures and a bolt 18 extends through these apertures and has a head bearing against the side of the base plate 10 remote from the bracket. The bolt is provided with a screw thread formation at its other end receiving a wing nut 19 and a compression spring 20 surrounds the bolt between the nut 19 and the adjacent surface of the center portion 15 of the bracket to pivotally connect the bracket to the base plate for turning movement of the former relative to the latter. The bracket center portion is provided in its surface adjacent the base plate with angularly spaced apart, radially disposed grooves 21 and the base plate is provided on its surface adjacent the center portion of the bracket with angularly spaced apart, radially extending ribs 22 which engage in the grooves in the bracket center portion to releasably retain the bracket at selected positions of angular adjustment relative to the base plate. The grooves and ribs are of somewhat triangular cross sectional shape, so that the bracket can be turned relative to the base plate by the application of manual pressure to either end of the bracket.

The arms 16 and 17 of the bracket are provided at their outer ends with perpendicularly disposed, upstanding portions 23 and 24, each of these upstanding portions being provided with spaced apart apertures, and a pair of rollers 25 and 26 extend along the bracket between the end portions 23 and 24 in spaced apart and substantially parallel relationship to each other and are journaled at their ends in the apertures in the corresponding upstanding end portions of the bracket arms.

Bodies 27 and 28 of flexible sheet material, such as waterproof paper, synthetic rubber or resin material, fabric or impregnated fabric, are secured to the rollers 26 and 27 respectively, each body of sheet material being secured at one end to the corresponding roller for winding onto and off of the roller and having at its other end a hem receiving a light stiffening rod.

The bodies of sheet material have a width somewhat greater than the width of a conventional automobile and a length somewhat greater than one half the length of such an automobile, so that when the bracket 14 with the rollers 26 and 27 is disposed substantially at right angles to the longitudinal center line of the automobile and adjacent the mid-length location thereof, the bodies of sheet material can be unwound from the rollers by pulling on the free ends of the sheet material bodies and the bodies can be pulled out and placed, one at a time, in covering relationship to the corresponding end portions of the automobile, as shown in Figure 5.

The rollers are preferably formed of suitable lengths of metal tubes and have elongated coiled springs therein, one end of each spring being connected to the associated roller and the other end to the adjacent bracket end portion, in a manner well known to the art, so that the springs are wound up as the bodies of material are wound off of the rollers and, upon release of the free ends of the bodies of sheet material, the springs will rewind the bodies of sheet material onto the corresponding rollers.

As stated above, the bracket may be turned about the base plate 10 between a position in which the longitudinal center line of the bracket is substantially at right angles to the longitudinal center line of the automobile, as explained above, and a position in which the longitudinal center line of the bracket is substantially parallel to the longitudinal center line of the automobile. When the bracket is in the latter position and the bodies of sheet material entirely wound onto the corresponding rollers, the bracket and rollers extend forwardly and rearwardly of the automobile and offer no material wind resistance to forward movement of the automobile. Also, when the bracket is in this latter position either one of the sheet material bodies or curtains can be pulled outwardly from the associated roller and supported in a position at which it extends laterally from the roof of the automobile to provide an awning or shelter at the corresponding side of the automobile. Such an awning or shelter may be used to protect a person from sun or rain while the person is engaged in some activity adjacent the automobile, for example, in changing an automobile tire.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An automobile canopy comprising a base plate having a central aperture and angularly spaced apart legs, suction cups of resilient material secured one on each leg at the outer end thereof for detachably securing said base plate to an automobile roof, a bracket including a center portion superimposed on said base plate and provided with a central aperture and arms projecting radially from said base plate in longitudinal alignment with each other and having perpendicularly disposed portions at their outer ends, means pivotally connecting said bracket to said base plate for turning movements of the former relative to the latter, rollers disposed in side by side relationship between the outer end portions of said arms and journaled at their ends on said outer end portions, and bodies of flexible sheet material secured one to each roller each at one end thereof for winding onto and off of the corresponding rollers.

2. An automobile canopy comprising a base plate having a central aperture and angularly spaced apart legs, suction cups of resilient material secured one on each leg at the outer end thereof for detachably securing said base plate to an automobile roof, a bracket including a center portion superimposed on said base plate and provided with a central aperture and arms projecting radially from said base plate in longitudinal alignment with each other and having perpendicularly disposed portions at their outer ends, means pivotally connecting said bracket to said base plate for turning movements of the former relative to the latter, rollers disposed in side by side relationship between the outer end portions of said arms and journaled at their ends on said outer end portions, and bodies of flexible sheet material secured one to each roller each at one end thereof for winding onto and off of the corresponding rollers, said base plate and the center portion of said bracket having mutually engaging formations thereon releasably locking said bracket in selected positions of angular adjustment relative to said base plate.

3. An automobile canopy comprising a base plate having a central aperture and angularly spaced apart legs, suction cups of resilient material secured one on each leg at the outer end thereof for detachably securing said base plate to an automobile roof, a bracket including a center portion superimposed on said base plate and provided with a central aperture and arms projecting radially from said base plate in longitudinal alignment with each other and having perpendicularly disposed portions at their outer ends, means pivotally connecting said bracket to said base plate for turning movements of the former relative to the latter, rollers disposed in side by side relationship between the outer end portions of said arms and journaled at their ends on said outer end portions, and bodies of flexible sheet material secured one to each roller each at one end thereof for winding onto and off of the corresponding rollers, said bodies of sheet material each having a width somewhat greater than the width of and a length somewhat greater than one half the length of a conventional automobile.

JERRY C. CHAMBERLAIN.

REFERENCES CITED

The following references are of record in the file of this patent:

UNITED STATES PATENTS

| Number | Name | Date |
| --- | --- | --- |
| 1,199,766 | Dewstow | Oct. 3, 1916 |
| 1,999,171 | Bryant | Apr. 30, 1935 |
| 2,109,571 | LeBoeuf | Mar. 1, 1938 |